United States Patent [19]

Kaida et al.

[11] Patent Number: 5,270,878
[45] Date of Patent: Dec. 14, 1993

[54] MAGNETIC RECORDING AND REPRODUCING APPARATUS

[75] Inventors: Katsuhiko Kaida; Hideo Masaki, both of Tokyo, Japan

[73] Assignee: Kabushiki Kaisha Toshiba, Kawasaki, Japan

[21] Appl. No.: 721,894

[22] Filed: Jun. 27, 1991

[30] Foreign Application Priority Data

Jun. 29, 1990 [JP] Japan .................... 2-173080

[51] Int. Cl.⁵ .............................. G11B 2/09
[52] U.S. Cl. ......................... 360/49; 360/77.02; 360/51
[58] Field of Search .......... 360/49, 51, 52, 72.1, 360/73.01, 77.04, 77.06, 77.02, 48; 369/44.26, 44.27, 33

[56] References Cited

U.S. PATENT DOCUMENTS

4,142,209  2/1979  Hedlund et al. ........... 369/44.26 X
4,151,571  4/1979  Cardot et al. ................. 360/49

*Primary Examiner*—Robert J. Pascal
*Assistant Examiner*—Ali Neyzari
*Attorney, Agent, or Firm*—Finnegan, Henderson, Farabow, Garrett & Dunner

[57] ABSTRACT

In a magnetic recording and reproducing apparatus, in order to prevent the address code data for identifying the cylinder number of a recording medium from producing continuous erase data, address code data with a gray code arrangement is modulated by a predetermined modulation method, and the modulated address code data is recorded on the recording medium. In this case, address clocks are recorded on the recording medium at predetermined intervals by the magnetization change in a predetermined direction. After the address clocks are recorded, the address data are recorded by the magnetization change in a direction opposite to the predetermined direction.

8 Claims, 11 Drawing Sheets

| ADDRESS CODE DATA | MODULATION DATA |
|---|---|
| 0 | 1 0 1 |
| 1 | 1 1 0 |

↑ ADDRESS CLOCK

FIG. 8

| ADDRESS CODE DATA | MODULATION DATA |
|---|---|
| 0 | 1 1 0 |
| 1 | 1 0 1 |

↑ ADDRESS CLOCK

| CYLINDER NUMBER | ADDRESS CODE DATA | INVERSE CONVERSION DATA | DECIMAL NUMBER |
|---|---|---|---|
| -015 | 00000000000 | 00000000000 | 0 |
| -014 | 00000000001 | 00000000001 | 1 |
| -013 | 00000000011 | 00000000010 | 2 |
| -012 | 00000000010 | 00000000011 | 3 |
| -011 | 00000000110 | 00000000100 | 4 |
| -010 | 00000000111 | 00000000101 | 5 |
| -009 | 00000000101 | 00000000110 | 6 |
| -008 | 00000000100 | 00000000111 | 7 |
| -007 | 00000001100 | 00000001000 | 8 |
| -006 | 00000001101 | 00000001001 | 9 |
| -005 | 00000001111 | 00000001010 | 10 |
| -004 | 00000001110 | 00000001011 | 11 |
| -003 | 00000001010 | 00000001100 | 12 |
| -002 | 00000001011 | 00000001101 | 13 |
| -001 | 00000001001 | 00000001110 | 14 |
| 000 | 00000001000 | 00000001111 | 15 |
| 001 | 00000011000 | 00000010000 | 16 |
| 002 | 00000011001 | 00000010001 | 17 |
| ≈ | ≈ | ≈ | ≈ |
| 706 | 01110111001 | 01011010001 | 721 |
| 707 | 01110111011 | 01011010010 | 722 |
| 708 | 01110111010 | 01011010011 | 723 |
| 709 | 01110111110 | 01011010100 | 724 |
| 710 | 01110111111 | 01011010101 | 725 |
| 711 | 01110111101 | 01011010110 | 726 |
| 712 | 01110111100 | 01011010111 | 727 |
| 713 | 01110110100 | 01011011000 | 728 |
| 711 | 01110110101 | 01011011001 | 729 |

F I G. 12

F I G. 13

MAGNETIC RECORDING AND REPRODUCING APPARATUS

BACKGROUND OF THE INVENTION

1. Field of the Invention

The present invention relates to a magnetic recording and reproducing apparatus.

2. Description of the Related Art

In a conventional magnetic disk apparatus of sector servo type, data tracks are used to record data in a magnetic disk as a recording medium, and arranged on a plurality of concentric circles. The data tracks each are also called a "cylinder". Each cylinder has a plurality of sectors. Each of the sectors has a servo area and a data area. Servo data is recorded in the servo area, and data to be read/written by a user is recorded in the data area. The servo data includes servo detection data for detecting the servo area, address code data for distinguishing the cylinder, and burst data for positioning a magnetic head on the center of the cylinder. The servo detection data has a signal pattern which is not used in the data to be read/written in the data area by a user. In the signal pattern, data in which no magnetization reverse occurs, i.e., continuous erase data, is recorded.

Figure 1A:
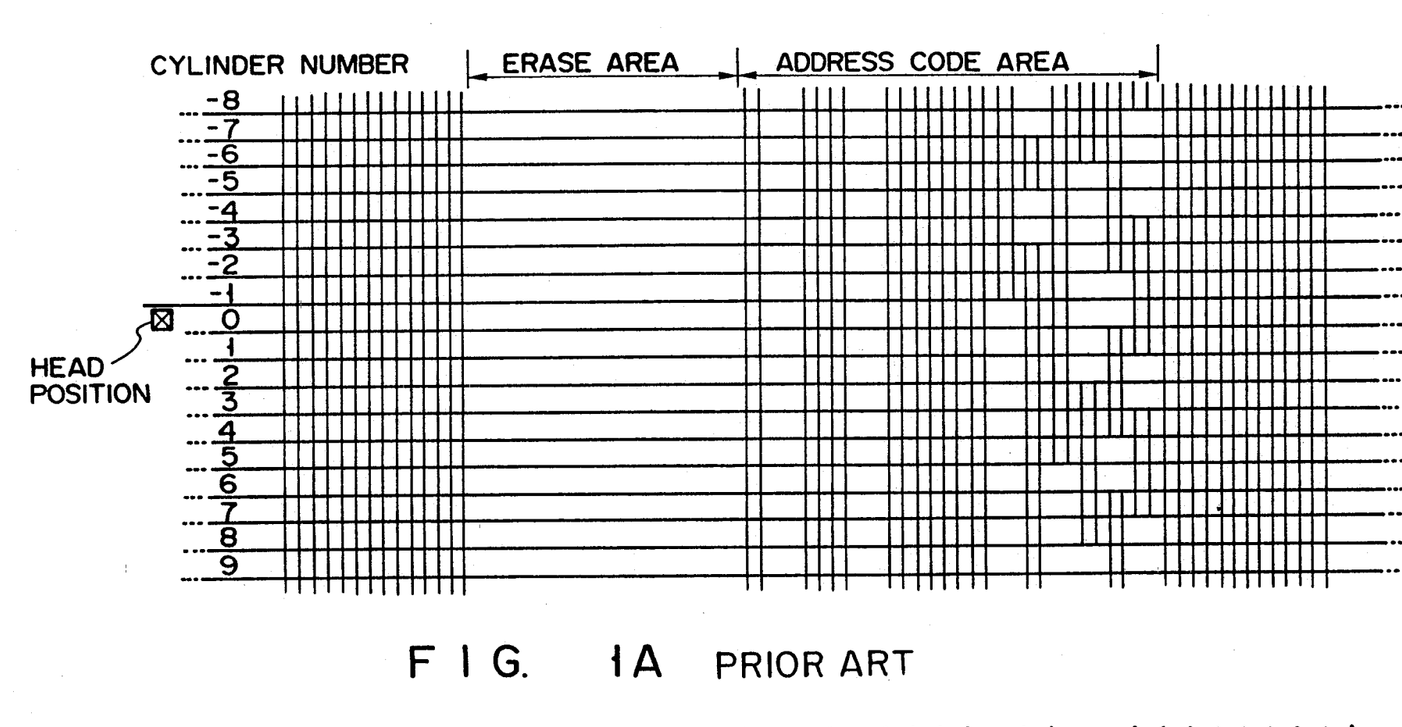
FIGS. 1A and 1B show a part of a servo area of a recording medium and a reproduction signal waveform obtained when a head position is at cylinder number 0.
Figure 1B:
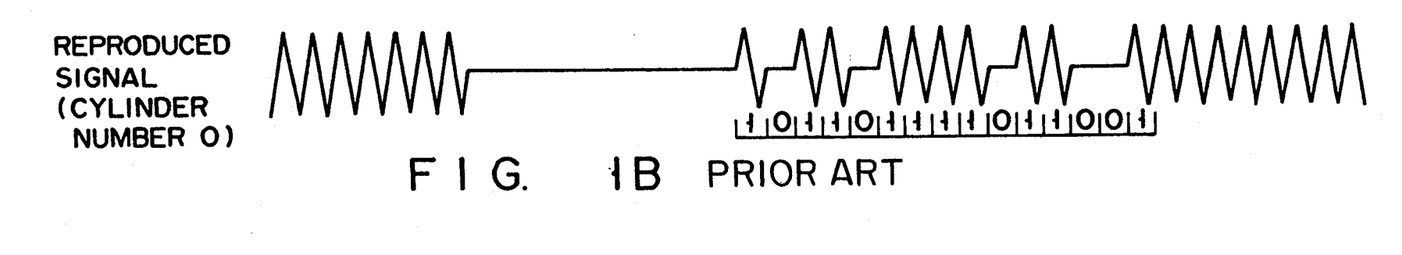

FIG. 1A shows a part of the servo area in each sector of the recording medium. In the figure, a magnetization direction of recorded data is not shown. Vertical lines indicate magnetization reverse locations of the recorded data. The servo detection data is recorded in a portion called an erase area, and the address code data is recorded in a portion called an address code area. FIG. 1B shows a reproduced signal waveform obtained when the magnetic head is located at cylinder number 0 of the recording medium.

In general, the determination of address code data "0" or "1" is performed on the basis of the presence/absence of a dibit. The dibit means that two reproduced signals, each having positive or negative polarities, are generated by two magnetization changes occurring in a predetermined time period. If the dibit is present, the address code data is "1". If the dibit is absent, the address code data is "0". The address code data "0" and "1" are modulated by a modulation method capable of obtaining modulation data "00" and "11", as shown in FIG. 2, and the modulation data is recorded on the recording medium as NRZ (non return to zero) data, as shown in FIG. 3.

If the address code data "0" is continuously recorded on the address code area, it is difficult to distinguish the address code data from the servo detection data including the erase data. However, if the address code data "0" is recorded so as not to be continuous, the relationship between the address code data and cylinder number becomes complex and much time is required to convert the address code data into cylinder number. In addition, if the data length of the address code data is long, the servo area in each sector increases and accordingly the data area decreases. That is, the recording capacity of the recording medium for data which a user can read/write is decreased.

Figure 2:
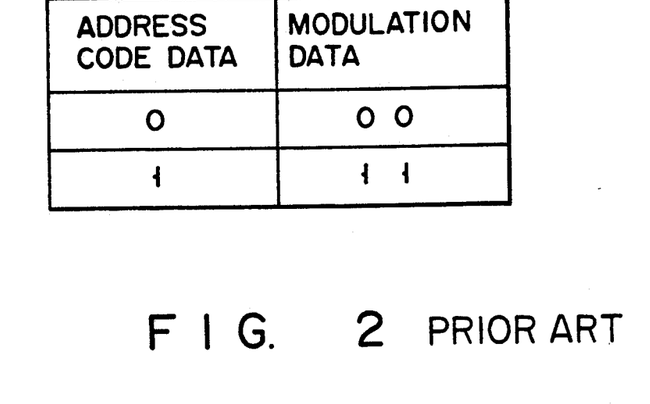
FIG. 2 shows modulation data obtained by a predetermined modulation method.
Figure 3:
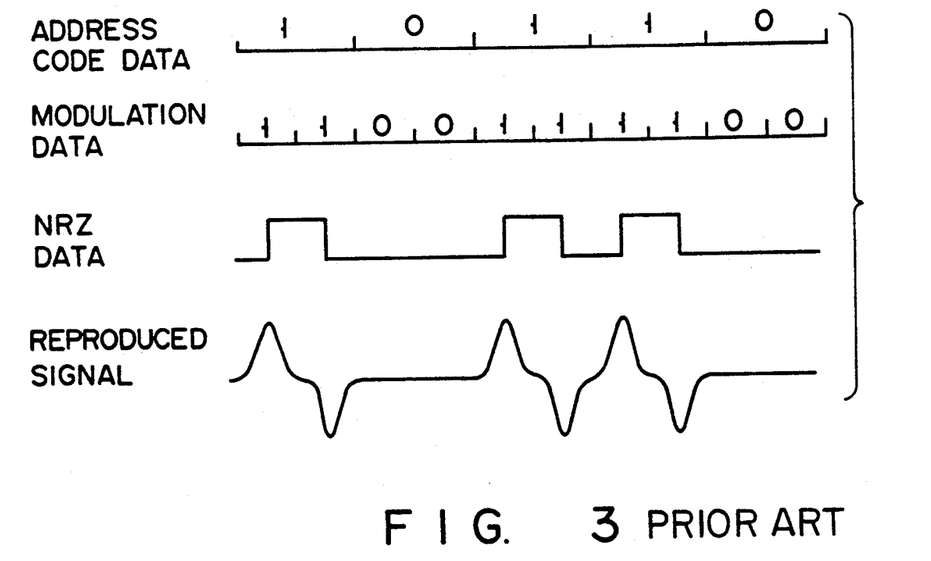
FIG. 3 is a view for explaining the address code data recording for the recording medium.

In the modulation method capable of obtaining the modulation data, as shown in FIG. 2, since a peak shift amount of a readout signal output from the magnetic head is large, the error rate increases in relation to the determination of the address code data "0" and "1". However, if the recording frequency is decreased to prevent the increase of the error rate, the servo area increases, as stated above, and the recording capacity of the recording medium for data which a user can read/write decreases.

Under the circumstances, there has been a demand for a magnetic recording and reproducing apparatus capable of converting the address code data to the cylinder number at high speed, reducing the peak shift amount, and decreasing the servo area.

SUMMARY OF THE INVENTION

It is an object of the present invention to provide a magnetic recording and reproducing apparatus.

According to the present invention, there is provided a magnetic recording and reproducing apparatus comprising: a recording medium including a plurality of address code areas for recording address code data having address clocks and address data, the address code data being used to distinguish a cylinder number provided to each data track of the recording medium, the address clock being recorded into the address code areas by a magnetic flux change to a desired direction, the address data being recorded address code areas by the magnetic flux change to a direction opposite to the desired direction after the address clock is recorded; and detecting means for detecting reproduced signals of the address code data from the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will now be described with reference to the accompanying drawings.

Figure 4:
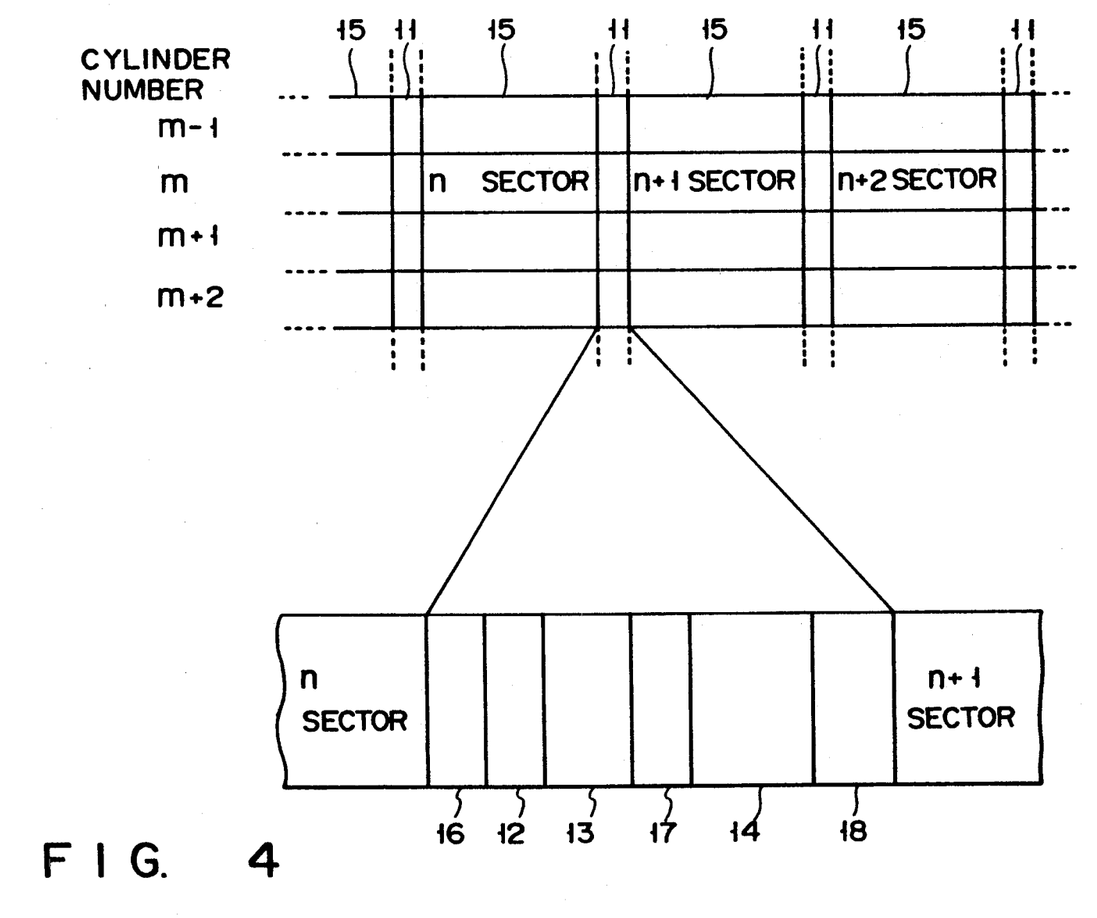
FIG. 4 is a schematic view of a data format of the recording medium according to an embodiment of the present invention.

As is shown in FIG. 4, a recording medium (disk) according to an embodiment of the invention, which is used in, e.g. a sector servo type magnetic disk apparatus, includes servo areas 11 for recording servo data in the respective sectors and data areas 15 for recording data to be read/written by a user. Each servo area 11 includes an erase area 12, an address code area 13, a burst pattern area 14, a reference signal area (AGC) 16 and 17, and a gap 18.

Servo detection data for detecting the servo area 11 is recorded in the erase area. Continuous DC erase data (or no signal) is used as the servo detection data. Address code data for identifying the cylinder number is recorded in the address code area 13. Burst data having a plurality of patterns for positioning a magnetic head (not shown) on the center of each cylinder is recorded in the burst pattern area 14. The reference signal areas (AGC) 16 and 17 record data for automatic gain control for adjusting the signal level of a reproduced signal output from the magnetic head. By the automatic gain control, the signal levels of reproduced signals, which differ between the inner peripheral portion and outer peripheral portion of the disk, can be equalized. The gap 18 is provided to prevent a data read/write error or the like due to rotational fluctuation of the disk.

Figure 5A:
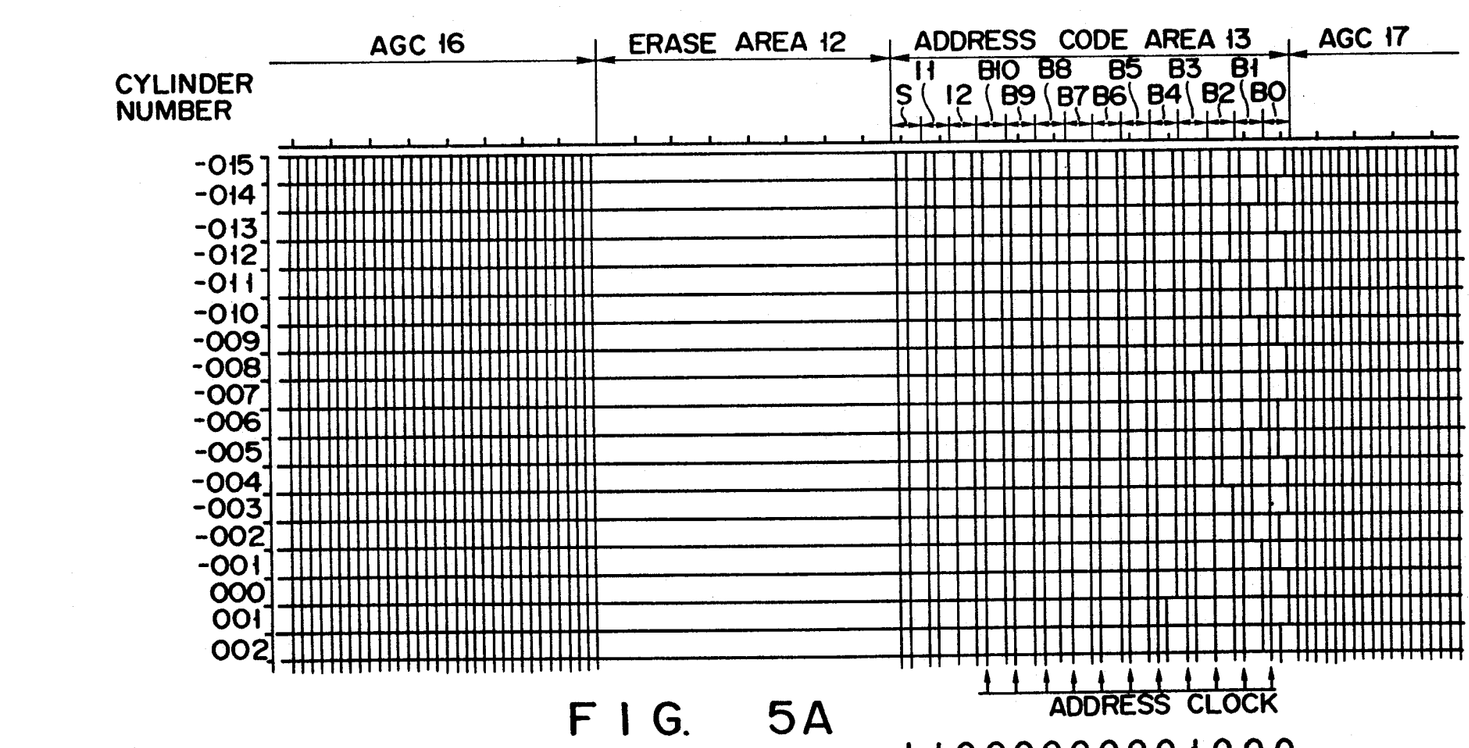
FIGS. 5A and 5B show an erase area and an address code area according to FIG. 4, and a reproduced signal waveform obtained at cylinder number 000.
Figure 5B:
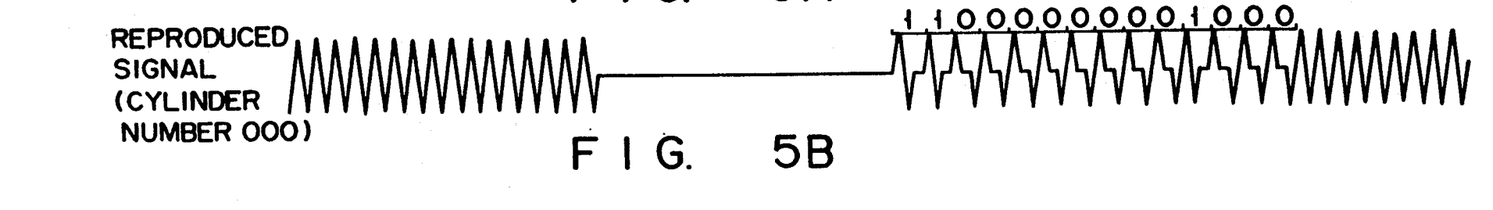

As is shown in FIG. 5A, start data S, index data I1 and I2, and address code data B10 to B0 are recorded in address code area 13. In FIG. 5A, a magnetization direction of recorded data is not shown. Vertical lines indicates magnetization inversion locations of the recorded data. FIG. 5B shows a reproduced signal waveform obtained when the head is positioned at cylinder number 000. Referring to 5B, the start data S is "1", the index data I1 and are "1" and "0", and the address code data B10 to B0 "00000001000".

Figure 6A:
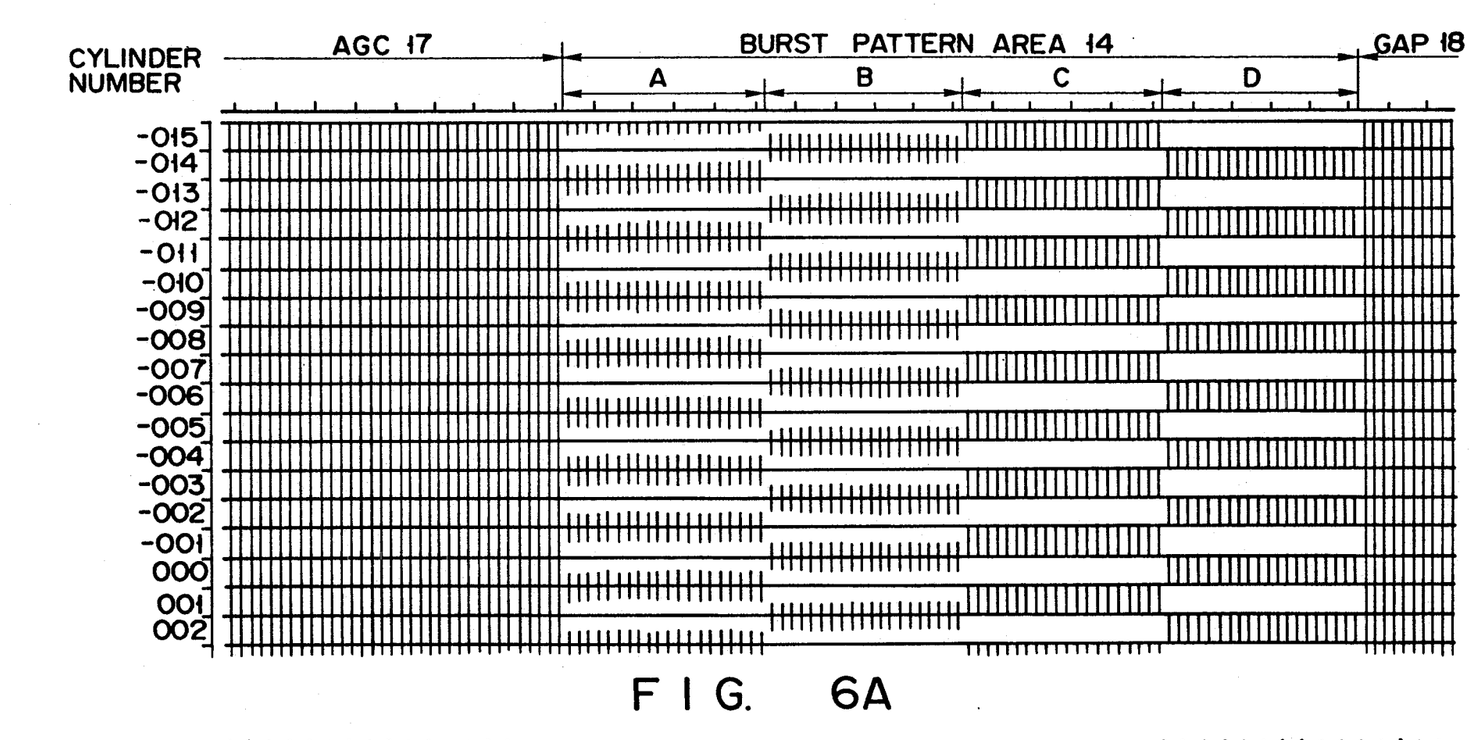
FIGS. 6A and 6B show a burst pattern area according to FIG. 4, and a reproduced signal waveform obtained at cylinder number 000.
Figure 6B:
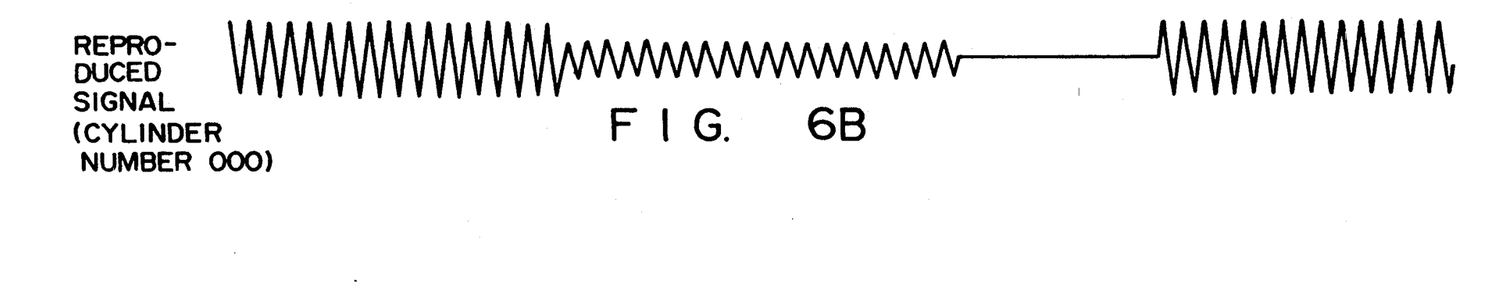

As is shown in FIG. 6A, the burst pattern area 14 has four pattern areas, i.e., burst areas A to D. The burst data recorded in the burst areas A to D are used for the position control of the magnetic head, following the speed control of the magnetic head. Specifically, in the speed control, the magnetic head is moved to a target cylinder (target track) on the basis of the address code data. When the magnetic head reaches the target track, the speed control is switched to the position control. In the position control, the signal levels of reproduced signals corresponding to the burst data recorded on the burst areas A to D are compared. Therefore, the magnetic head is positioned at the center of the target cylinder.

Next the address code data in the embodiment of the invention will now be described.

As has been described above, the address code data for identifying the cylinder number is recorded in the address code area 13. The address code data has an address clock, and further has address data representing absolute positions at which inherent data patterns are provided on the respective cylinders or address data representing relative positions at which data patterns are repeated every plural cylinders. For example, in the data format shown in FIG. 7A, the cylinder number indicating the absolute position is used as absolute address data. On the other hand, in the data format shown in FIG. 7B, the cylinder number indicating the relative position is used as relative address data.

Figure 7A:
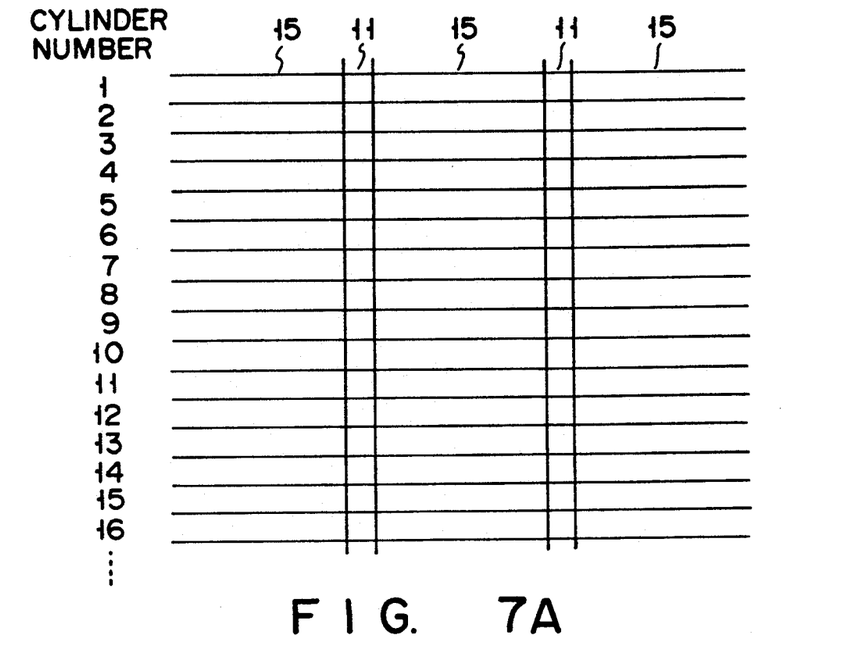
FIGS. 7A and 7B show an absolute position and a relative position of the data format.
Figure 7B:
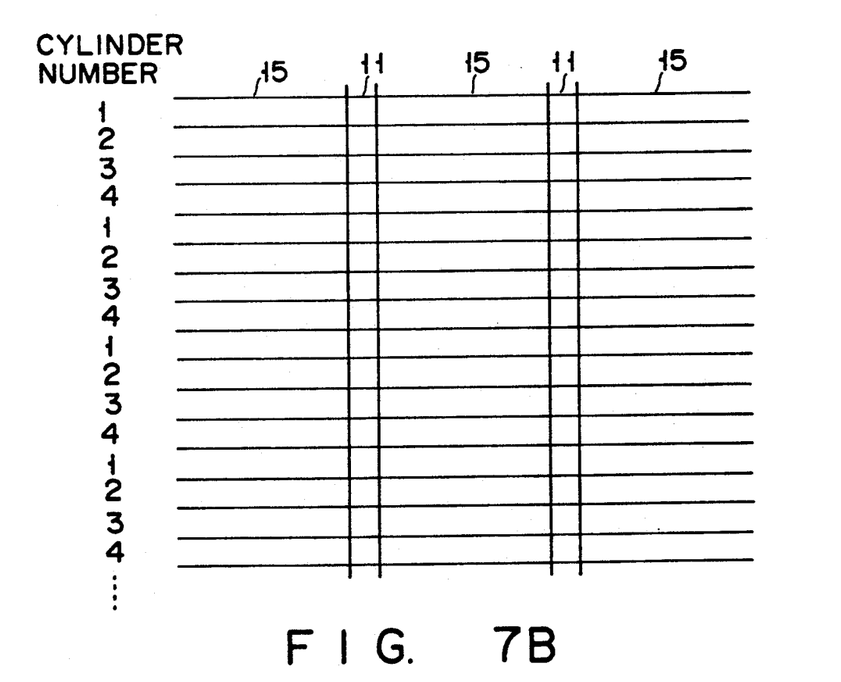

The address clock is recorded by changing the magnetization direction at predetermined intervals. After the address clock is recorded, the address data is recorded in a magnetization direction opposite to the magnetization direction of the address clock. The address code data B10 to B0 between two adjacent cylinders have a gray code arrangement in which the values of the address code data differ by one bit.

Figure 8:
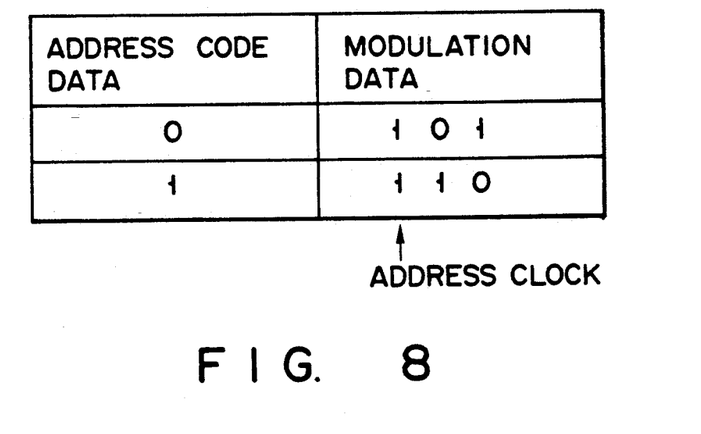
FIGS. 8 and 9 show modulation data used in the embodiment of the invention.
Figure 9:
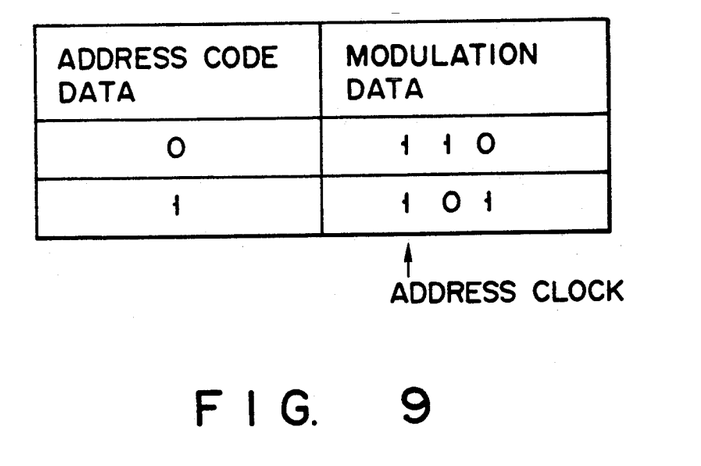

In the embodiment, the address code data "0" and "1" are modulated by the modulation method for obtaining modulation data including the address clock, as shown in FIG. 8 or FIG. 9, and the modulated data is recorded in the address code area 13 as NRZ (non return to zero) data. Specifically, in FIG. 8, the address code data "0" is converted to modulation data (NRZ data) "101", and the address code data "1" is converted to modulation data "110". In FIG. 9, the address code data "0" is converted to modulation data "110", and the address code data "1" is converted to modulation data "101".

The determination of the address code data "0" and "1", which correspond to the modulation data recorded as described above, is performed on the basis of the time interval between the reproduced signal of the address clock and the reproduced signal of the address data. A detection circuit for detecting the address code data will now be described with reference to FIGS. 10 to 13.

Figure 10:
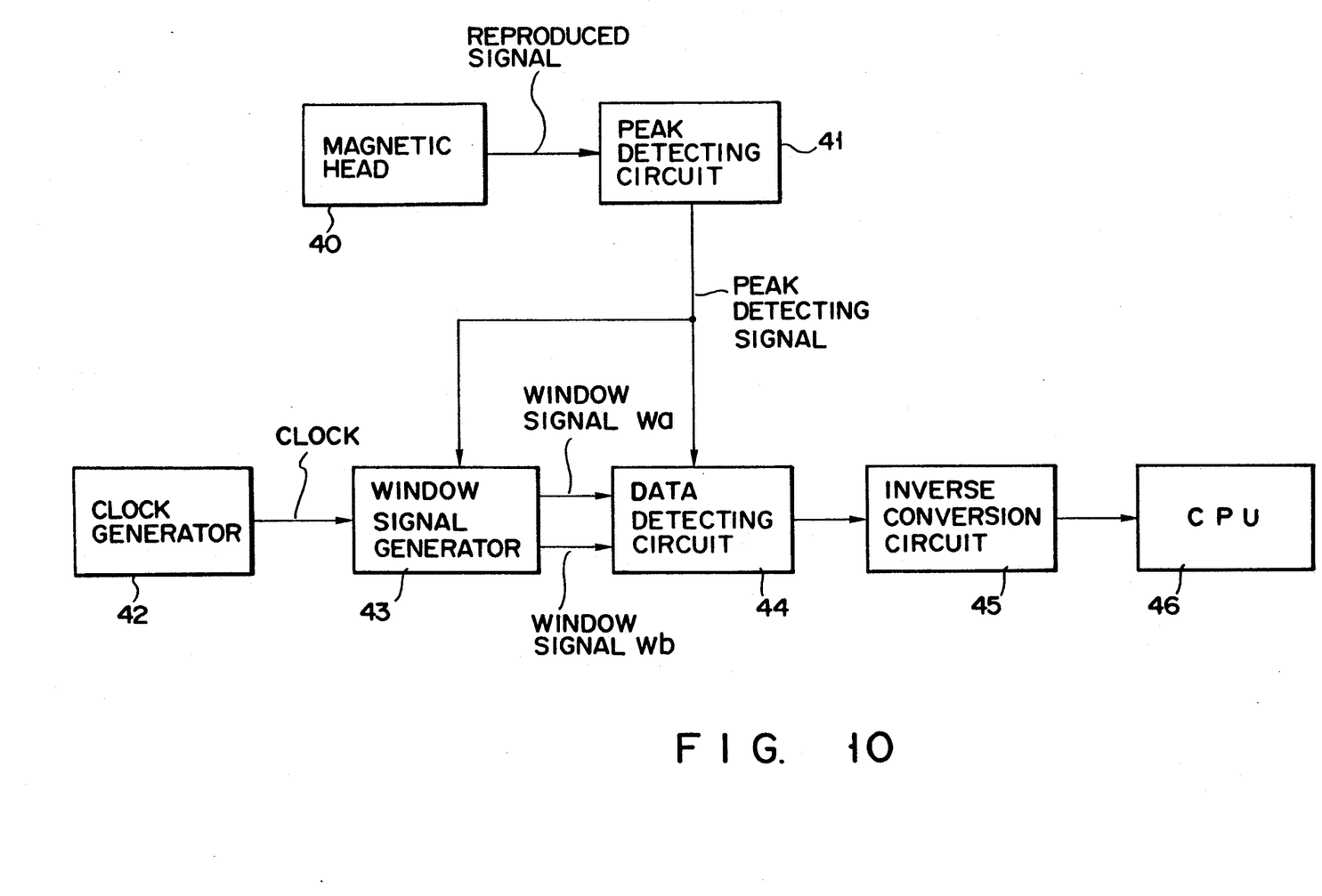
FIG. 10 is a block diagram showing a data determination unit.

Referring to FIG. 10, the detection circuit of this embodiment comprises a magnetic head 40, a peak detecting circuit 41, a clock generator 42, a window signal generator 43, a data detecting circuit 44, an inverse-conversion circuit 45, and a CPU (central processing unit) 46. Address code data is modulated in accordance with the modulation data as shown in FIG. 8.

Figure 11:
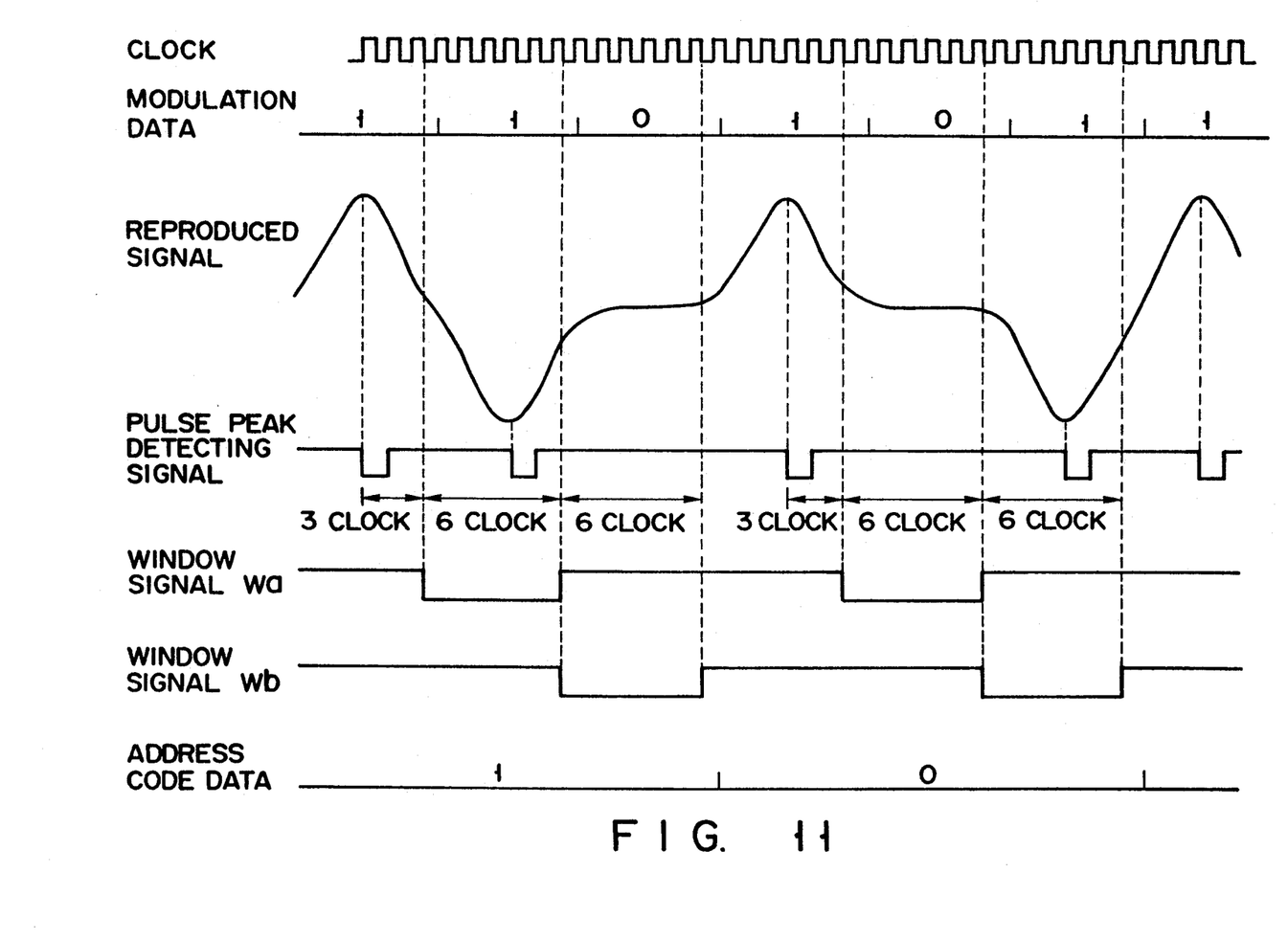
FIG. 11 is a timing chart showing various signals in the detection unit.

As shown in FIG. 11, a reproduced signal output from the magnetic head 40 is input to the peak detecting circuit 41. The peak detecting circuit 41 detects a peak of the input reproduced signal and outputs a peak detecting signal. The window signal generator 43 counts a clock signal output from a clock generator 42 from the falling point of the peak detecting signal and outputs window signals Wa and Wb in accordance with a count value. The window signal Wa is used to detect the address code data "1", and the window signal Wb is used to detect address code data "0". The window signal Wa is at a low level for a period required to count six clocks, after three clocks are counted from the falling point of the peak detecting signal. On the other hand, the window signal Wb is at a low level for a period required to count six clocks, after nine clocks are counted from the falling point of the peak detecting signal.

The data detecting circuit 44 detects the presence/absence of the peak detecting signal in a low level period of the window signals Wa and Wb, and detects the address code data "0" and "1" in accordance with a detection result. More specifically, when the peak detecting signal is detected in the low level period of the window signal Wa, the address code data is determined to be "1". On the other hand, when the peak detecting signal is detected in the low level period of the window signal Wb, the address code data is determined to be "0".

As has been described above, the address code data "B10" to "B0" recorded on the address code area 13 are arranged in the gray code arrangement, and the address code data between the adjacent cylinders differ from each other only by one bit. In order to identify the cylinder number on the basis of the address code data constructed by the gray code arrangement, the inverse-circuit 45 performs the inverse conversion of the address code data determined by the data detecting circuit 44.

When the three-bit address code data "000" is inverse-converted by the inverse-conversion circuit 45, the inverse-converted data is "000". In like manner, "001" is inverse-converted to "001", "011" to "010", "010" to "011", "110" to "100", "111" to "101", "101" to "110", and "100" to "111", respectively.

Figure 12:
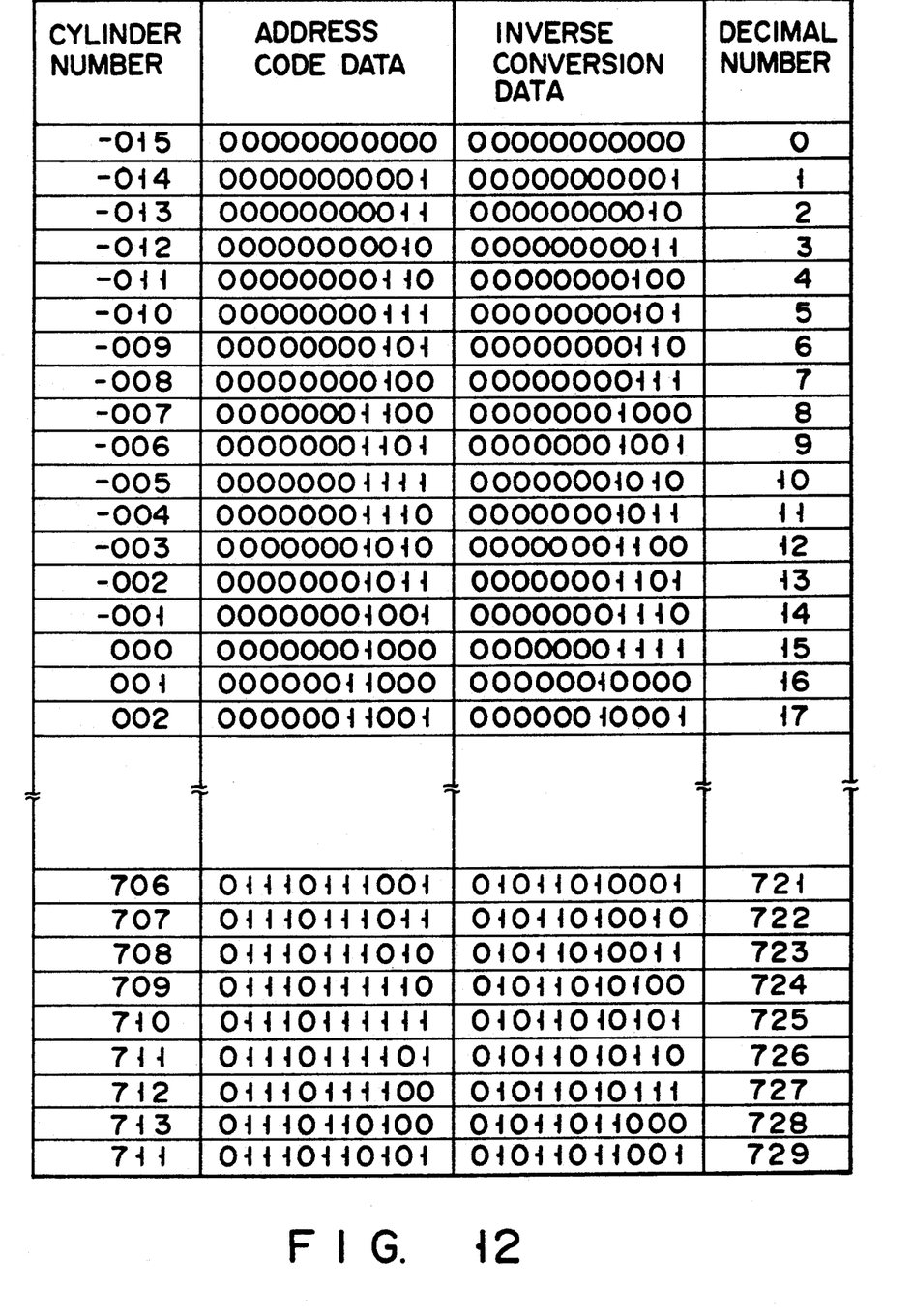
FIG. 12 shows a relationship between address code data and inverse-conversion data.

As is shown in FIG. 12, in the relationship between the cylinder number and the address code data, the cylinder number is expressed in the decimal system. Thus, the cylinder number corresponds to a value obtained by subtracting "15" from the value of the inverse-conversion data expressed in the decimal system.

Specifically, when the address code data is "00000000000", the inverse-data is "00000000000" which corresponds to "0" in the decimal system. Thus, "−15" obtained by subtracting "15" from "0" in the decimal system, is the actual cylinder number. When the address code data is "01110110101", the inverse-conversion data is "01011011001" corresponding to "729" in the decimal system. Thus, "714" obtained by subtracting "15" from "729" in the decimal system, is the actual cylinder number.

Figure 13:
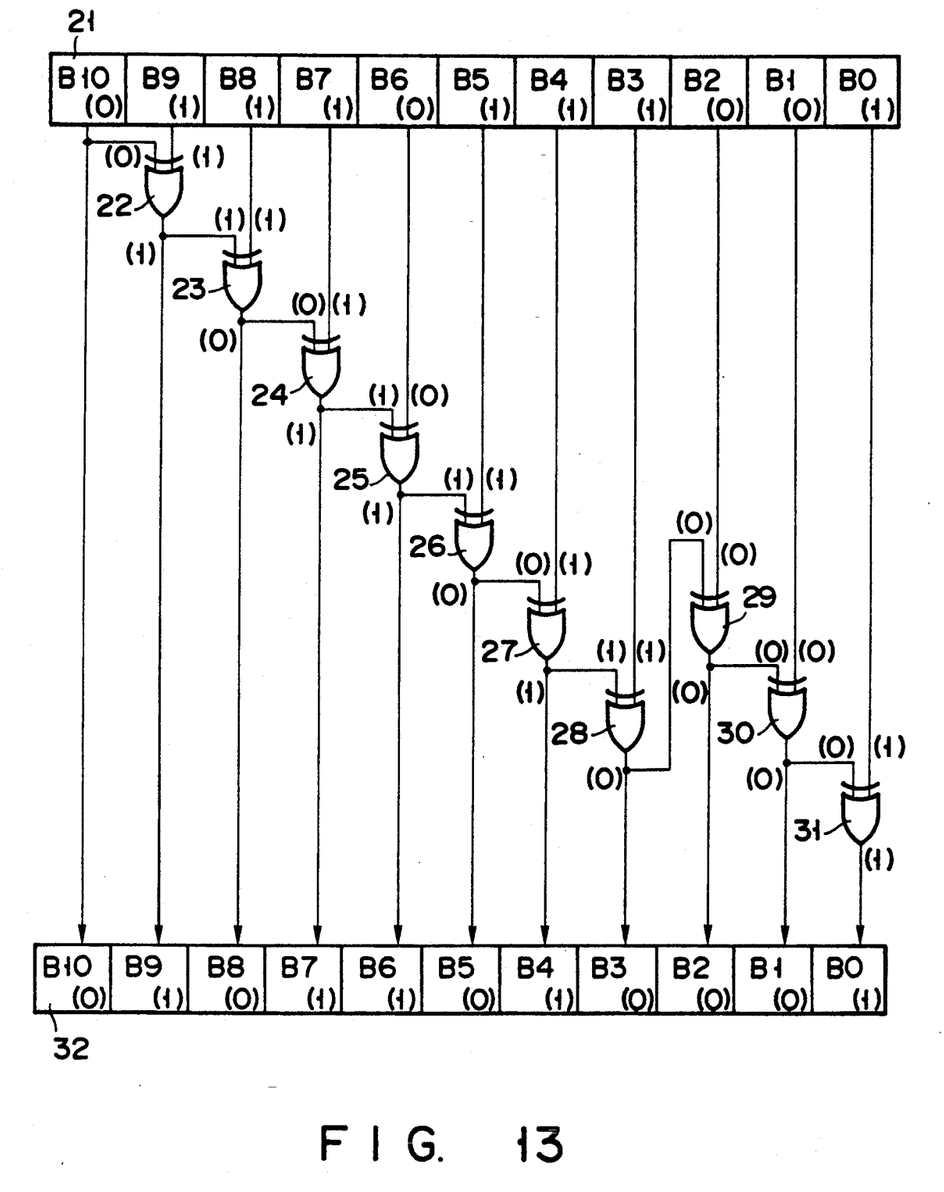
FIG. 13 shows an inverse-conversion circuit.

As is shown in FIG. 13, the above-mentioned inverse-conversion circuit 45 comprises registers 21 and 32, and exclusive-OR circuits (hereinafter referred to as "EX-OR circuits") 22 to 31. The register 21 stores the address code data "B10" to "B0". The EX-OR circuits 22 to 31 are used for inverse-converting the address code data stored in the register 21. The register 31 stores the address code data "B10" to "B0" inverse-converted by the EX-OR circuits 22 to 31, as the inverse-conversion data.

When the cylinder number is "706", the address code data "01110111001" is stored in the register 21. The EX-OR circuit 22 performs an exclusive-OR operation with respect to the address code data "B10" and "B9", and outputs resultant data of the exclusive-OR operation. The EX-OR circuit 23 performs an exclusive-operation with respect to the output data from the EX-OR circuit 22 and the address code data "B8", and outputs resultant data. In like manner, resultant data is output from the EX-OR circuits 24 to 31, and stored as inverse-conversion data "01011010001" in the register 32.

The CPU 46 obtains the actual cylinder number on the basis of the inverse-conversion data stored in the register 32.

As has been described above, the address code data representing the cylinder number is stored in the address code area 13 by using the predetermined modulation method. That is, the address clock is recorded on the address code area 13 by the magnetization change in a predetermined direction. After the address clock is recorded, the address data is recorded on the address code area 13 by the magnetization change in a direction opposite to the predetermined direction. Thus, the address code data is not recorded as continuous erase data. In addition, the inverse-conversion of the gray-code-arranged address code data can be performed by a conventional method, the address code data can be converted to the cylinder number quickly and easily.

In the modulation method, since the maximum interval of peaks of adjacent reproduced signals generated by the magnetization change, is less than approximately double the minimum interval, the peak shift amount is small. Therefore, the error rate in determining the address code data "0" and "1" can be decreased, further, it is not necessary to decrease the recording frequency, as in the prior art. Consequently, since the data length of the address code data is decreased and the servo area is narrowed, the data area for recording read/write data can be broadened.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic recording and reproducing apparatus, comprising:
   a recording medium including a plurality of address code areas for recording address code data having units each of which comprise an address clock and address data, the address code data being used to distinguish a cylinder number allocated to each data track of the recording medium, the address clock being recorded into the address code areas by a magnetization change in a desired direction, the address data being recorded in the address code areas by a magnetization change in a direction opposite to the desired direction after the address clock is recorded; and
   detecting means for detecting reproduced signals of the address code data from the address code areas of the recording medium and for generating data corresponding to the cylinder number in accordance with the address data.

2. The apparatus according to claim 1, wherein first modulation data obtained by modulating address code data 0 by a desired modulation method, to record the address code data 0 into the recording medium, if 101 and second modulation data obtained by modulating the address code data 1 by said desired modulation method, to record the address code data 1 into the recording medium, is 110.

3. The apparatus according to claim 1, wherein first modulation data obtained by modulating address code data 0 by a desired modulation method, to record the address code data 0 into the recording medium, is 110 and second modulation data obtained by modulating the address code data 1 by said desired modulation method, to record the address code data 1 into the recording medium, is 101.

4. The apparatus according to claim 1, wherein the address code data includes information representing the cylinder number corresponding to an absolute address.

5. The apparatus according to claim 1, wherein the address code data includes information representing the cylinder number corresponding to a relative address.

6. The apparatus according to claim 1, wherein the address code data is arranged by a gray code arrangement.

7. The apparatus according to claim 1, wherein said detecting means further includes means for detecting the address clock generated at regular intervals from the reproduced signals, and means for generating window signals for detecting data corresponding to the cylinder number from the address data based on the address clock.

8. A method of recording and reproducing address code data used to distinguish a cylinder number by a magnetic recording and reproducing apparatus, said method comprising the steps of:

recording the address code data in an address code area of a recording medium, the address code data having units each of which comprises an address clock and address data, the address clock being recorded in the address code area by a magnetization change in a desired direction, the address data being recorded into the address code area by a magnetization change in a direction opposite to the desired direction after the address clock is recorded;

detecting reproduced signals of the address code data from the address code area of the recording medium;

detecting the address clock at regular intervals from the reproduced signals; and generating data corresponding to the cylinder number in accordance with the address data.

* * * * *

UNITED STATES PATENT AND TRADEMARK OFFICE
CERTIFICATE OF CORRECTION

PATENT NO. : 5,270,878
DATED : December 14, 1993
INVENTOR(S) : Katsuhiko Kaida et al.

It is certified that error appears in the above-indentified patent and that said Letters Patent is hereby corrected as shown below:

Claim 2, column 6, line 45, change "if " to --is--.

Signed and Sealed this

Sixth Day of September, 1994

Attest:

BRUCE LEHMAN

Attesting Officer      Commissioner of Patents and Trademarks